United States Patent Office 3,395,160
Patented July 30, 1968

3,395,160
PROCESS FOR PRODUCING SUBSTITUTED
BENZOQUINONES AND HYDROQUINONES
Robert L. McLean, West Chicago, Ill., assignor to Ethyl
Corporation, New York, N.Y., a corporation of Virginia
No Drawing. Filed Sept. 24, 1964, Ser. No. 399,070
10 Claims. (Cl. 260—396)

ABSTRACT OF THE DISCLOSURE

Nitrosophenols are hydrolyzed to benzoquinones in an aqueous acidic medium at 150–200° C. Carbonyl compounds such as acetone are promoters. The benzoquinones can be reduced to hydroquinones.

This invention relates to a process for producing benzoquinones. This invention relates further to a process for producing hydroquinones. In particular, this invention relates to a process of producing benzoquinones by the hydrolysis of nitrosophenols and to the reduction of benzoquinones so produced to the corresponding hydroquinones.

The benzoquinones and hydroquinones produced by this process are reactive chemical intermediates and have the many utilities known for this type of compound. The benzoquinones produced by this process, for example, are easily reduced to hydroquinones and can, therefore, function in organic reactions as oxidizing agents. The hydroquinones produced by the process of this invention are useful as antioxidants in organic media, such as gasoline, plastics, rubber, and the like. The hydroquinones can also be used as reducing agents in chemical reactions. Furthermore, the hydroquinones can be converted to other useful compounds, such as antioxidants. For example, 2-tert-butyl-hydroquinone is readily methylated by dimethylsulfate to yield 2-tert-butyl-4-methoxyphenol, a valuable food antioxidant.

In the past, the use of these compounds has been curtailed by their general unavailability and high cost of preparation. This is particularly true of 2,6-di-alkyl-benzoquinones and hydroquinones. The preparation of these compounds has been accomplished only by involved and indirect routes requiring expensive reagents and starting materials.

One of the most formidable problems involved in the preparation of 2,6-di-alkyl-para-benzoquinones is that the oxidation routes known in the art lead to extensive by-product formation. Thus, for example, in the prior art methods, the oxidation of 2,6-di-tert-butylphenol leads primarily to 3,3',5,5' - tetra - tert-butyldiphenoquinone. Furthermore, the prior art methods for the oxidation of such commercial compounds as 2,6-di-tert-butyl-4-methylphenol ("Ionol") leads to the formation of extensive amounts of products such as 3,5-di-tert-butyl-para - hydroxybenzaldehyde, 1,2-bis(3,5-di-tert-butyl-4-hydroxyphenol)ethane, and 3,3',5,5'-tetra-tert-butylstilbene-4,4'-benzoquinone; M. S. Kharasch et al. J., Org. Chem., 22, 1439–43 (1957).

Some of the prior art methods of preparing benzoquinones or hydroquinones are based upon the reaction of alkali metal hydroxides with halophenols at high temperatures. Unfortunately, these processes are not readily applicable to complex phenols and, in particular, they are not readily applicable to 2,6-dialkylated phenols because the elevated temperatures required lead to extensive rearrangement and decomposition.

There exists, therefore, a need for a process capable of converting complex phenols to benzoquinones in high yields and which does not extensively contaminate the desired benzoquinone with decomposition products. This invention satisfies that need.

An object of this invention is to provide a novel method for the preparation of benzoquinones. Another object is to provide a process for the preparation of para-benzoquinones. A further object is to provide a process for the preparation of alpha-branched ortho alkylated para-benzoquinones. A particular object of this invention is to provide a process ideally suited for the preparation of 2,6-di-tert-butyl-para-benzoquinone. Other objects will be apparent from the following detailed description and appended claims.

The objects of this invention are accomplished by providing a process for producing a benzoquinone which comprises the hydrolysis of a nitrosophenol. A preferred embodiment of the present invention is a process which comprises the hydrolysis of a nitrosophenol at an elevated temperature. A further preferred embodiment is the hydrolysis of a nitrosophenol at a temperature of from about 150 to 200° C. Another preferred embodiment is a process for producing a benzoquinone comprising the hydrolysis of para-nitrosophenols at a temperature of from about 150 to 200° C. A still further preferred embodiment of this invention is the hydrolysis of a para-nitrosophenol substituted in at least one ortho position with an alpha-branched alkyl radical carried out at a temperature of from about 150 to 200° C. Still another preferred embodiment is the hydrolysis of a nitrosophenol carried out at from about 150 to 200° C. in the presence of a carbonyl compound and in a reaction medium having a pH of less than 7. In a most preferred embodiment of this invention the nitrosophenol is 2,6-di-tert-butyl-4-nitrosophenol or 2 - tert-butyl-4-nitrosophenol.

Other researchers have successfully hydrolyzed nitrosophenols to the corresponding benzoquinone in high yield only by including in the reaction mixture a large amount of cuprous oxide. For example, M. S. Kharasch et al., J. Org. Chem., 27, page 651 (1962), reports the hydrolysis of 2,6-di-tert-butyl-4-nitrosophenol to 2,6-di-tert-butyl-benzoquinone using a 6.7 to 1 mole ratio of cuprous oxide to nitrosophenol in order to effect the desired hydrolysis. In contrast, the process of this invention produces benzoquinones in high yields, in the substantial absence of cuprous oxide or other metal oxides.

As stated above, in a preferred embodiment of the instant process, nitrosophenols are hydrolyzed to benzoquinones at a temperature within the range of from about 150° to about 200° C. I have found that, quite unexpectedly, when the hydrolysis of a nitrosophenol is carried out in this temperature range, results are obtained that are equal or superior to those previously attainable only with the use of a large amount of cuprous oxide.

Nitrosophenols suitable for use in this process have a nitroso radical and a hydroxy group bonded to a benzene ring. Current theory teaches that nitrosophenols exist as an equilibrium mixture of a nitrosophenol and an oxime.

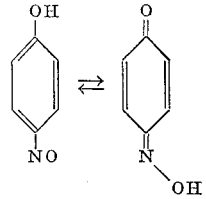

This invention is independent of the state or equilibrium in which the particular nitrosophenol might exist and operates as well on the equilibrium mixture of nitrosophenol and oxime as it does on the pure nitrosophenol.

Although the present invention is operable on nitrosophenols containing a fused benzene ring system, it is particularly adapted to the conversion of mononuclear nitrosophenols to the corresponding benzoquinone. The preferred nitrosophenols used in this invention are, therefore, mononuclear nitrosophenols; that is, the hydroxyl radical and the nitroso radical are bonded to an isolated benzene ring.

The present invention is operable on either ortho or para nitrosophenols. When ortho-nitrosophenols are subject to the process of this invention, the resultant benzoquinone is an orthobenzoquinone. Similarly, when para-nitrosophenols are subject to the process of this invention, the resultant product is a para-benzoquinone. The more preferred nitrosophenols of this invention are para-nitrosophenols. In general, the para-benzoquinones produced from them have been found to have greater utility.

Highly preferred nitrosophenols of this invention are mononuclear para-nitrosophenols in which at least one position ortho to the phenolic hydroxyl radical is substituted with an alpha-branched alkyl or aralkyl group. Such nitrosophenols have the formula:

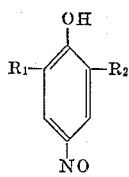

wherein $R_1$ and $R_2$ are the same or different radicals and are selected from the group consisting of hydrogen, secondary or tertiary alkyl radicals containing 3 to 12 carbon atoms, cycloalkyl radicals containing 3 to 12 carbon atoms, or aralkyl radicals containing 3 to 12 carbon atoms, such that at least one of the radicals is an alkyl, cycloalkyl or aralkyl radical. Such radicals other than hydrogen are frequently referred to as alpha-branched radicals in that the carbon atom in the position adjacent to the benzene ring has a side chain branch containing at least one carbon atom. Examples of such radicals are isopropyl, sec-butyl, tert-butyl, sec-amyl, sec-isoamyl, tert-amyl, sec-hexyls, tert-hexyls, sec-dodecyls, tert-dodecycls, cyclopropyl, cyclopentyl, cyclohexyl, α-methylbenzyl, α,α-dimethylbenzyl, 4-isopropyl-α,α-dimethylbenzyl, and the like. In a most preferred nitrosophenol of this invention $R_1$ and $R_2$ are both tert-butyl groups, resulting in the compound 2,6-di-tert-butyl-4-nitrosophenol. It is with nitrosophenols such as this, wherein many prior art processes cause decomposition or rearrangement of the alkyl substitutent, that the present invention is most useful.

The nitrosophenols used in this invention may be prepared by any of the several methods already known in the art. For example, nitrosyl chloride reacts readily with phenolic compounds having an open para position to yield para-nitrosophenols; (Moyer, U.S. 2,074,127, March 1937). The procedure most frequently used is the reaction of nitrous acid with phenolic compounds having an unsubstituted ortho or para position. A facile method of effecting this reaction is to dissolve the phenolic compound in a suitable solvent, such as an alcohol, and add thereto a stoichiometric quantity of sodium nitrite. Following this, an aqueous solution of sulphuric acid is gradually added to convert the sodium nitrite to nitrous acid which nitrosates the phenol. Preferably, the temperature is maintained between 0 and 10° C. during this addition. The nitrosophenol produced in this manner is usually insoluble in the reaction medium and precipitates therefrom.

As previously stated, the process of this invention is equally operable on ortho-nitrosophenols. Ortho-nitrosophenols can be prepared in a manner similar to that described above for para-nitrosophenols with the exception that the phenolic starting material must have an open ortho position and the reaction mass must also contain copper sulfate. This procedure is described by Cronheim, J. Org. Chem., I, 7 (1947).

The preferred hydrolysis mixture used in the present process comprises water, a carbonyl compound and an acid. The quantity of hydrolyzing mixture should be sufficient to effect the desired hydrolysis. The hydrolysis mixture should preferably contain sufficient water to provide the equivalent of at least one mole of water per mole of nitrosophenol reactant. In general, the quantities of hydrolysis mixture should be from 1 to about 50 times the weight of the nitrosophenol reactant, although more or less can be used. A more preferred range is from 2 to about 40 times the weight of the nitrosophenol reactant, and a most preferred range is from about 5 to about 30 times the weight of the nitrosophenol.

Carbonyl compounds useful in the hydrolysis mixture include both ketones and aldehydes. Although any ketone or aldehyde that does not react with the nitrosophenol or quinone and which is not itself oxidized in the reaction can be used, the preferred compounds are low molecular weight ketones and aldehydes. Thus, the preferred ketones are acetone, methylethylketone, diethylketone, and the like. The most preferred ketone is acetone. Likewise, preferred low molecular weight aldehydes are formaldehyde, paraformaldehyde, acetaldehyde, propionaldehyde, butyrylaldehyde, valerylaldehyde, and the like. The most preferred aldehydes are formaldehyde and paraformaldehyde.

When water soluble carbonyl compounds such as acetone or methylethylketone are employed in this reaction they can also serve the function of solubilizing the nitrosophenol reactant into the aqueous phase. The solubilization of the nitrosophenol into the aqueous phase serves to greatly accelerate the hydrolysis rate.

There should be from about 1 to about 100 moles of carbonyl compound in the hydrolysis mixture for every mole of nitrosophenol, although more or less can be used. When the carbonyl compound also functions as a solubilizing agent higher concentrations are usually employed. Thus, when using a water soluble carbonyl compound such as acetone, a preferred concentration range is from about 50 to about 90 weight percent, and a most preferred concentration range is from about 75 to about 85 weight percent. When the carbonyl compound employed does not function to solubilize the nitrosophenol then much lower concentrations in the hydrolysis mixture are generally used, as long as there is about one mole or more of carbonyl compound per mole of nitrosophenol.

When low carbonyl compound concentrations are employed there is usually another material added to act as a mutual solubilizing agent. Any material inert under the reaction conditions employed and tending to solubilize the nitrosophenol into the aqueous phase may be used. A preferred solvent fulfilling this requirement is alcohol. The more preferred alcohols are the water soluble alcohols. The most preferred alcohols are low molecular weight alcohols containing from 1 to about 4 carbon atoms. Examples of such alcohols are methanol, ethanol, propanol, isopropanol, butanol, ethyleneglycol, propyleneglycol, and the like. The most preferred alcohols used in this invention are methanol and isopropanol.

Another class of compounds useful as solubilizing agents are the ether alcohols. The preferred ether alcohols are those produced from the condensation of an alkylene oxide with a mono- or poly-hydroxy alcohol. The more preferred ether alcohols are those produced from the condensation of ethylene oxide with a low molecular weight mono- or poly-hydroxy alcohol. The most preferred ether alcohols are the water soluble ether alcohols. Some examples of ether alcohols fulfilling these requirements are monomethylethyleneglycol, monoethylethyleneglycol, monomethyldiethyleneglycol, monoethyldiethyleneglycol, and the like. The most preferred ether alcohols are monomethylethyleneglycol and monoethylethyleneglycol.

When solubilizing agents are used they are usually present in quantities sufficient to cause at least a part of the nitrosophenol to dissolve in the aqueous phase. A preferred concentration range is from about 25 to about 90 weight percent of the hydrolysis mixture. A more preferred concentration range is from about 50 to about 90 weight percent, and a most preferred concentration range is from about 75 to about 85 weight percent of the hydrolysis mixture.

The acids employed in the hydrolysis mixture include any acid soluble in the reaction mixture capable of lowering the pH below 7. The preferred acids are the mineral acids such as hydrochloric, sulphuric, orthophosphoric, metaphosphoric, nitric, and the like. The most preferred acids used in the hydrolysis mixture are hydrochloric and sulphuric.

The quantity of acid used should be sufficient to maintain the pH of the hydrolysis mixture below 7. A preferred concentration range of acid in the hydrolysis mixture is from about 0.1 to about 50 weight percent. A more preferred range is from about 0.5 to about 25 weight percent. A most preferred acid range resulting in rapid hydrolysis with substantially no degradation of reactants is from about 1 to about 5 weight percent.

The temperature at which the hydrolysis is carried out is critical. At temperatures below 150° C. yields decrease rapidly. Thus, when the hydrolysis of 2,6-di-tert-butyl-4-nitrosophenol was carried out at about 100° C. a benzoquinone yield of only 26 percent was obtained, whereas when the same hydrolysis was carried out in an autoclave at 175° C. a yield of 78 percent was obtained—a threefold yield improvement.

A series of experiments were conducted to demonstrate the criticality of the hydrolysis temperature. In each experiment an autoclave was charged with:

| | Parts by weight |
|---|---|
| 2,6-di-tert-butyl-4-nitrosophenol | 10 |
| Water | 50 |
| 37 percent hydrochloric acid | 6 |
| Acetone | 198 |

The autoclave was sealed and heated to the temperature indicated in Table I below. The autoclave was maintained at the indicated temperature for about 2 hours, during which period its contents were agitated. It was then cooled and the contents steam distilled to obtain the indicated yield of 2,6-di-tert-butyl-para-benzoquinone. The following Table I gives the results of this series of experiments and demonstrates the criticality of using hydrolysis temperatures above 100° C., and especially in the range of from about 150 to about 200° C.

TABLE I

| Hydrolysis temperature (° C.): | Yield, percent |
|---|---|
| 100 | 26 |
| 150 | 63 |
| 175 | 78 |
| 200 | 59 |

The criticality of the temperature range at which the hydrolysis is conducted is apparent from the results given in the above table. Thus, the most preferred temperature range for conducting the hydrolysis of a nitrosophenol to a benzoquinone is from about 150 to about 200° C.

The process is carried out at a pressure sufficient to maintain the reactants in a liquid state. Therefore, the pressure is not an independent variable, but is a function of the temperature and composition of the hydrolysis mixture. When a volatile compound such as acetone is used in the hydrolysis mixture the pressure will be higher than when less volatile compounds are employed. In practice, the autoclave is merely sealed and heated to the desired hydrolysis temperature. The pressure is allowed to rise to whatever the vapor pressure of the contents are at the temperature employed. No supplementary pressure is required. In the critical temperature range of from 150 to 200° C. this usually results in pressures from about 150 to 400 p.s.i.g.

The hydrolysis should be carried out for a period sufficient to obtain the maximum yield of the desired benzoquinone. In general, the hydrolysis is complete in from about one to about four hours. A more preferred hydrolysis period is from about 1.5 to about 3.5 hours, and a most preferred hydrolysis period usually resulting in maximum yields of benzoquinones is from about two to about three hours.

The following examples illustrate some of the methods of conducting the process of this invention. All parts are parts by weight unless otherwise indicated.

Example I

To a pressure reaction vessel equipped with agitation means and thermocouple was charged:

| | Parts |
|---|---|
| 2,6-di-tert-butyl-4-nitrosophenol | 10 |
| Water | 50 |
| Acetone | 198 |
| 37 percent hydrochloric acid | 6 |

The reaction vessel was sealed and heated to 150° C. The reaction vessel contents were maintained at this temperature over a two hour period, while agitating. The vessel was then cooled and the contents steam distilled, yielding a product which was identified by its melting point as 2,6-di-tert-butyl-para-benzoquinone, which was obtained in 63 percent yield.

Example II

An experiment was conducted in the same manner as employed in Example I except that the reaction vessel contents were maintained at 175° C. over a three hour period. The product obtained by steam distillation was identified by its melting point as 2,6-di-tert-butyl-para-benzoquinone, which was obtained in 78 percent yield.

Example III

An experiment was conducted in the same manner as employed in Example I except that the reaction vessel contents were maintained at 200° C. over a two hour period. The product obtained by steam distillation was identified by its melting point as 2,6-di-tert-butyl-para-benzoquinone, which was obtained in 59 percent yield.

Example IV

To a pressure reaction vessel fitted as in Example I was charged:

| | Parts |
|---|---|
| 2,6-di-tert-butyl-4-nitrosophenol | 10 |
| 36 percent formaldehyde | 50 |
| Methanol | 250 |
| 37 percent hydrochloric acid | 6 |

The pressure vessel was sealed and the contents heated to 150° C. Agitation was continued at this temperature for a two hour period, following which the reactants were cooled and the vessel contents subjected to a steam distillation. The steam distillate contained a product identified by its melting point as 2,6-di-tert-butyl-para-benzoquinone, which was obtained in 46 percent yield.

Example V

To a reaction vessel as employed in Example I is charged:

| | Parts |
|---|---|
| 2-tert-butyl-4-nitrosophenol | 150 |
| Water | 18 |
| Paraformaldehyde | 30 |
| Methanol | 272 |
| Conc. sulphuric acid | 6.5 |

The reaction vessel is sealed and heated to 175° C. It is agitated at this temperature for two hours, following which it is cooled and the contents subject to a steam distillation, yielding 2-tert-butyl-para-benzoquinone.

Other solubilizing agents may be employed in place of methanol in the above example. Some examples of other solubilizing agents useful in the above example are ethanol, isopropanol, monomethylethyleneglycol, monoethylethyleneglycol, and monoethyldiethyleneglycol.

Likewise, other nitrosophenols can be substituted in the above example in equal mole quantities. For example, when para-nitrophenol is used, para-benzoquinone is obtained. The use of 2-isopropyl-4-nitrosophenol leads to o-isopropyl-para-benzoquinone. The use of 2,6-di-isopropyl-4-nitrosophenol results in the formation of 2,6 - di - isopropyl - para - benzoquinone. When 2-chloro-4-nitrosophenol is used, 2-chloro-para-benzoquinone is obtained. When 2,6-di-chloro-4-nitrosophenol is employed, 2,6-di-chloro-para-benzoquinone is obtained. The use of 2-sec-butyl-4-nitrosophenol results in the formation of 2-sec-butyl-para-benzoquinone. The use of 2,6-di-sec-dodecyl-4-nitrosophenol leads to the formation of 2,6-di-sec-dodecyl-para-benzoquinone. Likewise, the use of 2 - (α - methylbenzyl) - 4 - nitrosophenol yields 2-(α - methylbenzyl)para - benzoquinone. When 2,6 - di-cyclohexyl - 4 - nitrosophenol is employed, 2,6 - di-cyclohexyl-para-benzoquinone is obtained.

Example VI

To a pressure reaction vessel as described in Example I is charged:

| | Parts |
|---|---|
| 2-nitroso-4,6-di-isopropylphenol | 150 |
| Water | 36 |
| Methylethylketone | 135 |
| Orthophosphoric acid | 9 |

The vessel is sealed and the reaction contents heated to 175° C. While agitating, the vessel contents are maintained at a temperature of 175° C. for a three hour period. Following this, the pressure vessel contents are cooled and then steam distilled, yielding 2,4-di-isopropyl-o-benzoquinone.

Equally good results are obtained when equal mole quantities of other ortho-nitrosophenols are used in the above example. The use of 2-nitroso-6-tert-butylphenol results in the formation of 2-tert-butyl-o-benzoquinone. The use of 2-nitroso-4,6-di-tert-butylphenol leads to the formation of 2,4-di-tert-butyl-o-benzoquinone. When ortho-nitrosophenol is used, ortho-benzoquinone is produced. The use of 2-nitroso-4-dodecylphenol results in 2-dodecyl-o-benzoquinone.

Another important embodiment of this invention is a process for producing a hydroquinone, which comprises hydrolyzing a nitrosophenol at a temperature of from about 150 to about 200° C., and subsequently reducing the benzoquinone thereby produced with reducing means to yield a hydroquinone.

The preferred nitrosophenols and hydroylsis conditions employed in this embodiment of the present invention are the same as those previously set forth.

The benzoquinone need not be purified before carrying out the reduction step. However, in general, it is preferred to isolate and purify the benzoquinone prior to the reduction step because it is usually easier to purify the benzoquinone than the hydroquinone.

The reduction step may be carried out with chemical reducing means. Thus, a metal in combination with an acid can be used to effect the desired reduction. Metals that will react with acids to form hydrogen are employed. Typical metals of this type are zinc, iron, magnesium, aluminum, calcium, manganese, cadmium, and the like. The most preferred metals are zinc and iron.

The acids that can be used in the reduction step are those having sufficient acidity to react with the metal employed. Preferred acids are the mineral acids such as hydrochloric, sulphuric, orthophosphoric, and the like. The most preferred acid is hydrochloric acid. When hydrochloric acid is employed in the reducing step, excellent yields of hydroquinone are obtained at comparatively low cost.

Other chemical reducing means may be used in this process. Thus, sodium aluminum hydride, sodium hydride, sodium borohydride, and the like, can be employed. These chemicals aer not preferred because they are comparatively expensive.

An especially preferred reducing means that can be used in this process is catalytic hydrogenation. In this embodiment the benzoquinone is usually dissolved in an inert solvent and contacted with hydrogen and a hydrogenation catalyst. In conducting this reduction, any of the solvents utilized in the oxidation step of this process may be employed. The preferred solvents useful in the reduction step of this process are alcohols such as methanol, ethanol, propanol and isopropanol; aromatic hydrocarbons such as benzene, toluene, xylene, and mixtures thereof; and aliphatic hydrocarbons such as pentane, hexanes, heptanes, octanes, nonanes and decanes. The more preferred solvents used in the reduction step of this process are aliphatic hydrocarbons. Aliphatic hydrocarbons containing from about 6 to about 10 carbon atoms are highly preferred. When these hydrocarbons are employed, the reaction proceeds smoothly and, in many instances, the hydroquinone product is readily crystallized from the solvent.

Suitable hydrogenation catalysts are those commonly used in the art to catalyze the hydrogenation of organic compounds. Some examples of these include palladium chloride on charcoal, activated nickel, nickel-nickel oxide, platinum-platinum oxide, platinum on charcoal, copper chromite, Raney nickel, palladium, platinum black palladium sponge, nickel, copper impregnated alumina, palladium black, activated alumina, Raney copper, chromium, vanadium, molybdenum, and the like. The more preferred catalysts used in the reduction step are platinum, palladium, Raney nickel, copper impregnated alumina and copper chromite. The most preferred hydrogenation catalysts used in the reduction step of this embodiment of the present invention is Raney nickel.

The catalytic hydrogenation may be carried out at atmospheric pressure or at elevated pressures. Higher pressures usually result in faster hydrogenation rates. Extremely high pressures are not required because the benzoquinones produced in the oxidation step of the present invention are readily reduced. A preferred hydrogenation pressure range is from atmospheric pressure to about 1000 p.s.i.g. A more preferred pressure range is from about 10 to 500 p.s.i.g. A most preferred hydrogenation pressure range is from about 15 to about 100 p.s.i.g.

The hydrogenation is carried out at a temperature high enough to promote the reduction of the benzoquinone, but not so high as to cause degradation of the reactants, reaction medium or products. A preferred temperature range is from about 25° to 150° C. A more preferred temperature range is from about 40° to about 100° C., and a most preferred temperature range is from about 60° to about 80° C.

The reaction time required to convert various benzoquinones to hydroquinones will vary according to the reduction conditions employed and the particular benzoquinone being reduced. Higher temperatures usually promote faster reductions. Furthermore, higher hydrogen pressures usually afford faster reduction rates. In general, the reduction is usually complete in less than eight hours. A more preferred reaction time is from about 0.5 to 4 hours, and a most preferred reaction time is from about 0.5 to 1 hour.

The following examples combined with the previous examples serve to illustrate the embodiments of the present invention directed to a process for producing hydroquinones. All parts are parts by weight unless otherwise indicated.

Example VII

To a reaction vessel, equipped with stirring means and temperature measuring means, was added a solution of 13.2 parts of 2,6-di-tert-butyl-benzoquinone, as prepared in Example II, in 44 parts of isopropanol. To this was added 16 parts of zinc dust. Following this, 25 parts of concentrated hydrochloric acid (37 percent) was added dropwise over a 13 minute period. An exothermic reaction caused the temperature to rise to 70° C. This was accompanied by a color change of yellow to red to colorless with some evolution of gas. The reaction was cooled to room temperature whereupon a white precipitate separated. Twenty-nine parts of isopropanol were added to dissolve the precipitate. The mixture was then filtered to remove the excess zinc and the filtrate added to ice water. Fine white needles precipitated which were collected, dried and identified as 2,6-di-tert-butyl-hydroquinone by its melting point of 114–116° C.

In like manner, other benzoquinones can be reduced by following the procedure of the above example. The use of parabenzoquinone obtained from the oxidation of para-nitrosophenol results in para-hydroquinone. The use of o-isopropyl-para-benzoquinone obtained from the oxidation of 2-isopropyl-4-nitrosophenol results in the formation of o-isopropyl-para-hydroquinone. Likewise, when 2-tert-butyl-para-benzoquinone obtained from the oxidation of 2-tert-butyl-4-nitrosophenol is employed, o-tert-butyl-para-hydroquinone is obtained. In like manner, when 2-chloro-para-benzoquinone is used, 2-chloro-para-hydroquinone is obtained. When 2,6-di-chloro-para-benzoquinone is used, 2,6-di-chloro-para-hydroquinone is obtained. In general, any of the benzoquinones discussed in the earlier embodiment of the present invention directed at a process for producing benzoquinones can be used.

Example VIII

To a pressure reaction vessel, equipped with stirring means, temperature measuring means and a gas inlet tube, was added 110 parts mixed octanes, 22 parts 2,6-di-tert-butyl-para-benzoquinone and 1.5 parts Raney nickel. The vessel was then sealed and flushed with nitrogen. The vessel contents were then heated to 76° C. and the vessel pressure increased to 29 p.s.i.g. with hydrogen. While maintaining these conditions, the vessel was agitated for 35 minutes. After this reaction time, no further hydrogen up-take was observed. The vessel pressure was then vented and, while still warm, the vessel contents were filtered to remove the catalyst. On cooling to room temperature, 16.7 parts of fine white needles precipitated, which were identified as 2,6-di-tert-butyl-para-hydroquinone by its melting point of 114–116° C.

In like manner, other benzoquinones can be catalytically hydrogenated to yield the corresponding hydroquinones. Thus, the use of 2-tert-butyl-para-benzoquinone in the above example results in the formation of 2-tert-butyl-hydroquinone. In like manner, any of the benzoquinones disclosed in the earlier discussion of the embodiment of the present invention directed at a process for producing benzoquinones can be employed, resulting in the formation of the corresponding hydroquinone.

Having fully disclosed a process for the production of benzoquinones and a process for the production of hydroquinones and the great utility of the products derived therefrom, it is desired that the present invention be limited only within the spirit and scope of the following claims.

I claim:

1. A process for producing a benzoquinone, said process comprising reacting a mononuclear para-nitrosophenol with water at a temperature of from about 150° to about 200° C., said process being carried out in the presence of a carbonyl compound selected from the group consisting of low molecular weight aldehydes and ketones and in a reaction medium having a pH of less than 7 and which is substantially free of metal oxides.

2. The process of claim 1 wherein said para-nitrosophenol is substituted in at least one position ortho to the hydroxyl radical with an alpha-branched alkyl radical containing 3–12 carbon atoms.

3. The process of claim 1 wherein said carbonyl compound is acetone.

4. The process of claim 3 wherein said nitrosophenol is 2,6-di-tert-butyl-4-nitrosophenol.

5. The process of claim 3 wherein said nitrosophenol is 2-tert-butyl-4-nitrosophenol.

6. A process for producing a hydroquinone, said process comprising the steps of (A) reacting a mononuclear paranitrosophenol with water at a temperature of from about 150° to about 200° C. in the presence of a carbonyl compound selected from the group consisting of low molecular weight aldehydes and ketones in a reaction medium having a pH of less than 7 and which is substantially free of metal oxides, and (B) reacting the benzoquinone thereby produced with reducing means to produce a hydroquinone.

7. The process of claim 6 wherein said para-nitrosophenol is substituted in at least one position ortho to the hydroxyl radical with an alpha-branched alkyl radical containing 3–12 carbon atoms.

8. The process of claim 6 wherein said carbonyl compound is acetone.

9. The process of claim 6 wherein said nitrosophenol is 2,6-di-tert-butyl-4-nitrosophenol.

10. The process of claim 6 wherein said nitrosophenol is 2-tert-butyl-4-nitrosophenol.

References Cited

UNITED STATES PATENTS 3,213,114  10/1965  Braxton et al. _____ 260—625

OTHER REFERENCES

J. Chem. Soc., Barnes et al. (1961) pp. 953 to 956 relied on (QD1c6).

LORRAINE A. WEINBERGER, *Primary Examiner.*

L. A. THAXTON, *Assistant Examiner.*